United States Patent [19]
Hankinson

[11] Patent Number: 5,323,427
[45] Date of Patent: Jun. 21, 1994

[54] LATERALLY TRANSLATING PERMANENT SEAL RING FOR A NUCLEAR REACTOR CAVITY

[75] Inventor: Michael F. Hankinson, Monroeville, Pa.

[73] Assignee: Westinghouse Electric Corporation, Pittsburgh, Pa.

[21] Appl. No.: 96,232

[22] Filed: Jul. 26, 1990

[51] Int. Cl.$^5$ ............................................... G21C 13/00
[52] U.S. Cl. ..................................... 376/203; 376/205
[58] Field of Search .................................. 376/203, 205

[56] References Cited

U.S. PATENT DOCUMENTS

| 4,170,517 | 10/1979 | Meuschke | 376/203 |
|---|---|---|---|
| 4,747,993 | 5/1988 | Hankinson et al. | 376/205 |
| 4,904,442 | 2/1990 | Swidwa et al. | 376/203 |
| 5,230,860 | 7/1993 | Behnke et al. | 376/203 |

Primary Examiner—Donald P. Walsh
Assistant Examiner—Frederick H. Voss

[57] ABSTRACT

A nuclear reactor containment arrangement has a permanent seal ring across the thermal expansion gap defined by the reactor vessel wall and the containment wall. The seal ring allows for lateral translation of the reactor vessel, in addition to radial and axial expansion and contraction. The seal ring features an outer attachment arrangement characterized by a radially corrugated cylinder extending vertically between two annular Belleville plates having different diameters. The corrugations of the cylinder extend longitudinally between the cylinder edges, and flex during lateral movement of the reactor vessel relative to the containment wall. The Belleville plates accommodate axial expansion and contraction of the vessel, and an inner attachment arrangement accommodates radial expansion and contraction.

10 Claims, 6 Drawing Sheets

LATERALLY TRANSLATING PERMANENT SEAL RING FOR A NUCLEAR REACTOR CAVITY

BACKGROUND OF THE INVENTION

This invention relates to nuclear reactor containment arrangements, and more particularly to permanent seal rings extending across an annular thermal expansion gap between a peripheral wall of a nuclear reactor vessel and a containment wall wherein the seal ring provides a water tight seal across the expansion gap allowing for lateral translation of the reactor vessel relative to the containment wall.

Nuclear reactor vessels are typically positioned within a cavity defined by a concrete containment wall that may also contain shielding material. The containment wall is generally cylindrical in shape, having an upper portion defining a refueling canal above the reactor vessel and a lower portion spaced apart from and surrounding the reactor vessel. The annular expansion gap between the peripheral wall of the reactor vessel and the containment wall allows for thermal expansion and lateral movement of the reactor vessel in relation to the containment wall. Generally, the refueling canal is maintained dry during normal reactor operations. However, during refueling the upper portion of the reactor vessel is raised to expose the reactor core for the exchange of fuel assemblies. During the refueling operation, it is advantageous to fill the refueling canal with water to provide additional shielding. It is generally not desirable to fill the entire space defined by the containment wall with water, but rather to only flood the upper portion defining the refueling canal. A water tight seal ring is therefore provided across the annular gap between the peripheral wall of the reactor vessel and the containment wall at the boundary between the refueling canal and the lower annular portion, or well, in which the vessel is positioned.

Typically, the reactor vessel has a horizontally extending flange and the containment wall has a horizontally extending ledge at about the same elevation at which the seal ring attaches. Although removable gasket type seal rings are known, the elastomeric gaskets used must be carefully installed during each refueling operation and are susceptible to thermal degradation and leakage. Furthermore, the gasket must be replaced during each refueling operation.

It is advantageous to provide a permanent seal ring to reduce the time required for the refueling operation. However, permanent seal rings need to allow for thermal expansion of the reactor vessel that reduces the gap between the peripheral wall of the reactor vessel and the containment wall, and also ideally provide for some vertical and lateral movement of the reactor vessel relative to the containment wall. In addition, the seal ring should be able to withstand heavy blows from objects, such as fuel assemblies, accidentally dropped during refueling. Thus, the seal ring must have (1) strength to retain the large volume of water used in the refueling operation; (2) flexibility to accommodate movement of the reactor vessel within the containment wall; and (3) structural integrity to resist damage from falling objects.

Prior art seal rings are discussed in U.S. Pat. No. 4,747,993 to Hankinson et al. and in U.S. Pat. No. 4,904,442 to Swidwa et al., the disclosures of which are herein incorporated by reference. Although those designs provide accommodation for radial and axial thermal expansion/contraction of the reactor vessel relative to the containment wall experienced during reactor operation, they fail to provide for lateral movement of the reactor vessel relative to the containment wall. Such movement of the reactor vessel, that may be encountered during operation of the reactor, can cause a loss of integrity of the seal ring.

SUMMARY OF THE INVENTION

It is an object of the present invention to provide a permanent seal ring for a nuclear reactor containment arrangement that accommodates radial thermal expansion/contraction of the reactor vessel relative to the containment wall.

Another object of this invention to provide a permanent seal ring for a nuclear reactor containment arrangement that accommodates axial thermal expansion/contraction of the reactor vessel relative to a neutral position.

Another object of this invention is to provide a permanent seal ring for a nuclear reactor containment arrangement that accommodates lateral movement of the reactor vessel relative to the containment wall.

Another object of this invention to provide a permanent seal ring for a nuclear reactor containment arrangement that can provide a water seal between the refueling canal and the well that is resistant to damage from falling objects.

According to this invention, a nuclear reactor containment arrangement has an annular seal ring provided for the gap defined by the peripheral wall of a reactor vessel and a containment wall spaced apart from and surrounding the reactor vessel. The annular seal ring is sealingly affixed, proximate its inner radius, to an annular flange horizontally extending from the peripheral wall of the reactor vessel and sealingly affixed, proximate its outer radius, to the containment wall. The annular seal ring incorporates a unique outer attachment arrangement that allows the seal ring to accommodate axial and lateral movements of the reactor vessel. The key feature of the outer attachment arrangement is a radially corrugated cylinder that is connected to and works in conjunction with a pair of annular cantilever plates, or Belleville plates. The Belleville plates, which have some radial curvature between their inner and outer edges, provide flexible accommodation for axial movements. The corrugated cylinder, having its radial corrugations extending longitudinally between its edges, accommodates lateral movements. An inner attachment arrangement accommodates radial expansion and contraction of the reactor vessel.

A heavy gauge, annular, main seal plate extends horizontally across most of the gap. The lower surface of the main seal plate, proximate its inner edge, is supported by a cylindrical support affixed to and extending vertically upwards from the reactor vessel annular flange. An inner flexible seal connects the upper surface of the annular flange to the main seal plate at a radius inside the cylindrical support. An inner, first annular Belleville plate is sealingly affixed to the main seal plate near the first Belleville plate's inner edge, and extends radially outward therefrom. The main seal plate can have an annular protrusion extending upward from its upper surface proximate its outer edge to provide an attachment point for the first Belleville plate. The first Belleville plate, near its outer edge, is sealingly affixed to an edge of the radially corrugated cylinder. The other edge of the radially corrugated cylinder is sealingly affixed to an outer, second annular Belleville plate near the second Belleville plate's inner edge. The second Belleville plate is sealingly attached to the containment wall with an outer seal.

According to another aspect of the invention, the inner flexible seal can be provided by a flexible sealing member having a cylindrical portion sealingly affixed at its upper end to the main seal plate, and an annular, horizontally extending portion sealingly affixed to the annular flange of the reactor vessel. During radial expansion or contraction of the reactor vessel, the main seal plate and the outer flexural arrangement typically do not move. The cylindrical support slides underneath the main seal plate and the inner flexible seal deforms to accommodate the movement.

According to another aspect of the invention, the outer seal can comprise an annular member having an L-shaped radial cross section, wherein a horizontally extending portion of the annular member is sealingly affixed to the ledge of the containment wall, and the radially inner surface of a vertically extending cylindrical portion is sealingly attached to the outer edge of the second Belleville plate.

DETAILED DESCRIPTION OF THE INVENTION

The feature of this invention that allows the laterally translating permanent cavity seal ring to laterally translate is a specially designed custom bellows used on the outer portion of the seal ring. Most existing welded seal rings used in the nuclear industry utilize either an L-shaped section or a U-shaped section to allow thermal expansion of the reactor. These designs generally have the serious drawback in that they are axisymetric, i.e., the cross section of the seal does not vary at all with the circumference. For these arrangements, significant lateral translation of the reactor tends to cause a shear failure of the flexure at locations 90 degrees off the movement axis. Although traditional bellows with several annular U-shaped folds can accommodate some movement by flexing the bellows (elongating/compressing the opposite sides to rotate the bellow sections), the very large diameter and relatively short height of the seal ring makes this type of mechanical action impractical or impossible. The bellows used in this invention differs in that the radial corrugations extend transverse, rather than parallel, to the end surfaces.

Figure 1:
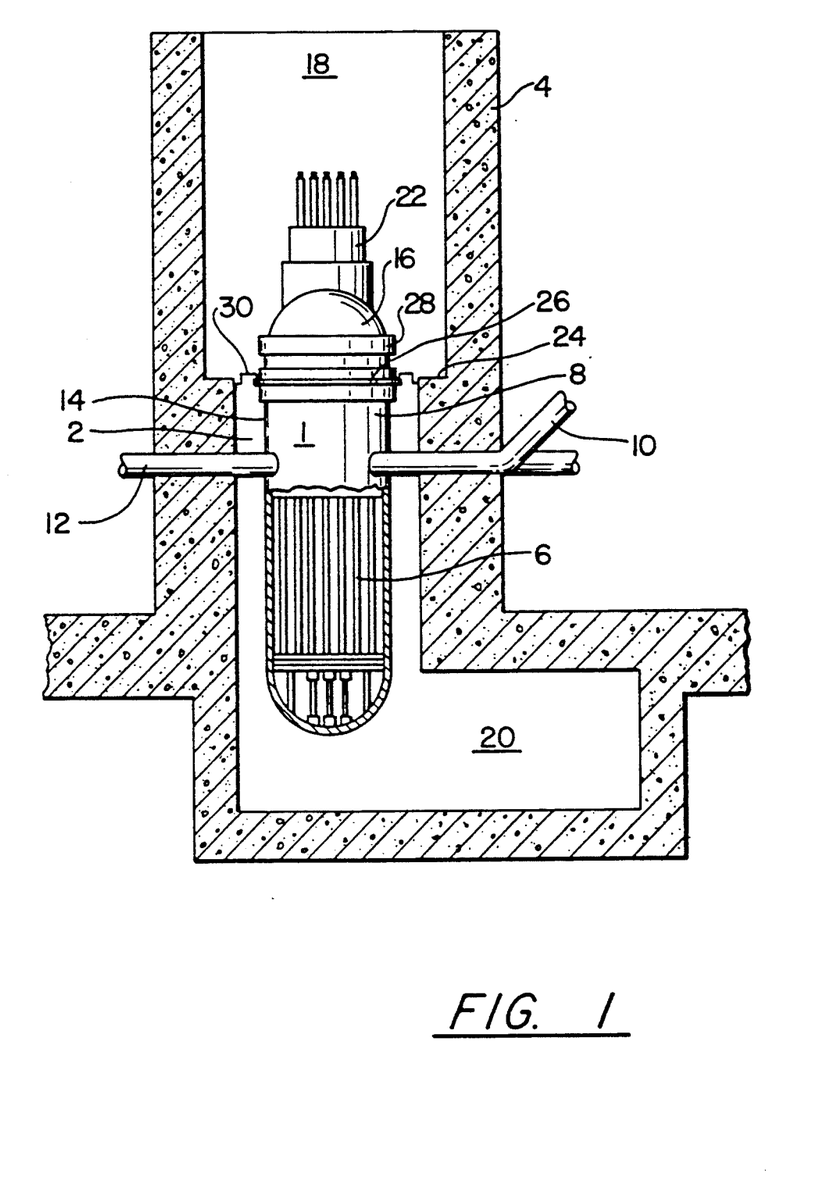
FIG. 1 is an elevational view partly in cross-section of a reactor containment incorporating an annular seal ring according to the invention.
Figure 2:
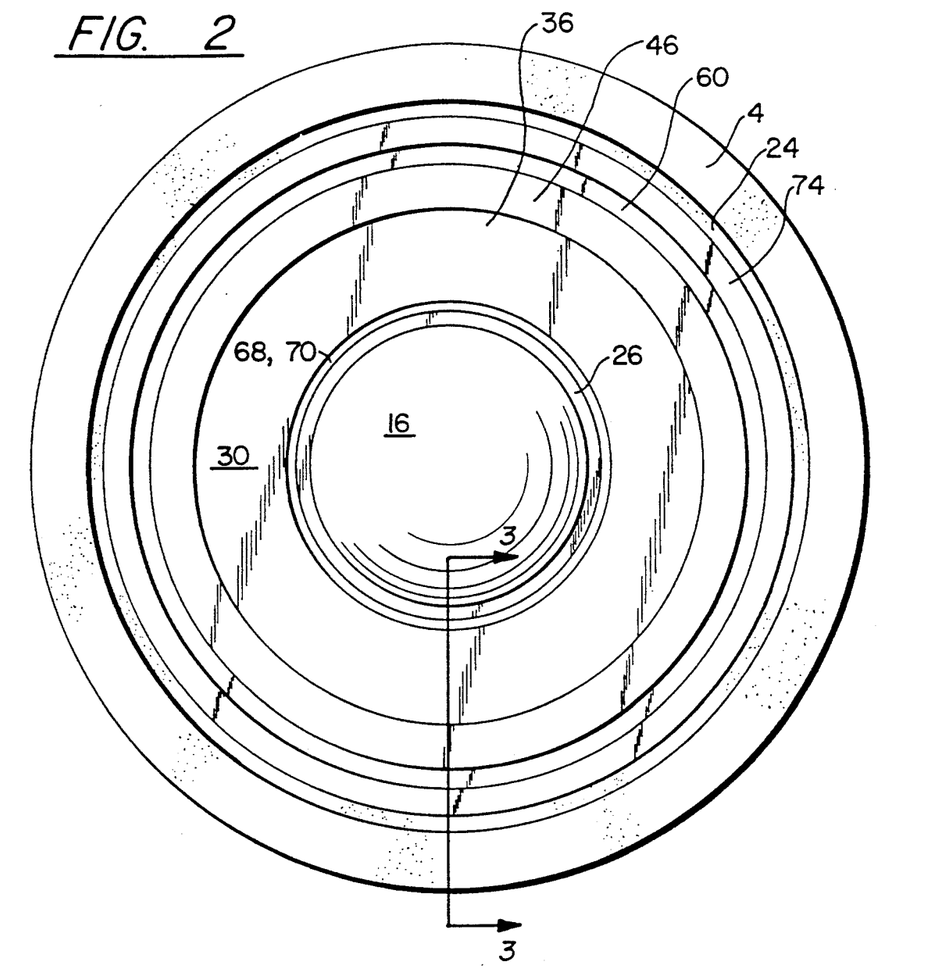
FIG. 2 is a plan view of the reactor containment of FIG. 1.

The features of this invention are better understood in reference to the drawings. Referring now to FIG. 1 and 2, a pressurized water reactor 1 is positioned within a space 2 defined by a containment wall 4. The reactor is of the pressurized water type, and the figure depicts a fuel rod assembly 6 contained within the reactor vessel 8. The reactor vessel s is supported by means not shown. A coolant flow inlet 10 and a coolant flow outlet 12 penetrate the cylindrical peripheral wall 14 of the reactor vessel 8. The control rods (not shown) that moderate the nuclear reaction are moved vertically by control means 22 extending through the removable reactor vessel head 16.

The reactor cavity 2 is divided into an upper portion which defines a refueling canal 18 and a lower portion defining a well 20 that surrounds the lower portion of the reactor vessel 8. A ledge 24 in the containment wall divides the refueling canal 18 from the well 20. The peripheral wall 14 of the reactor vessel has a horizontally extending annular flange 26 at about the elevation of the containment wall ledge 24. The reactor vessel head 16 is removably sealed to the lower portion of the reactor vessel by an annular flange 28 at an elevation above the horizontally extending reactor vessel flange 26.

A permanent cavity seal ring 30 of the present invention extends between the containment wall ledge 24 and the horizontally extending flange 26 of the peripheral wall of the reactor vessel. During a refueling operation the refueling canal 18 is first flooded with water and then the reactor head 16 is lifted, thereby exposing the reactor core. The water flooding the refueling canal provides a radiation shield for the exposed core and refueling assemblies.

Figure 3:
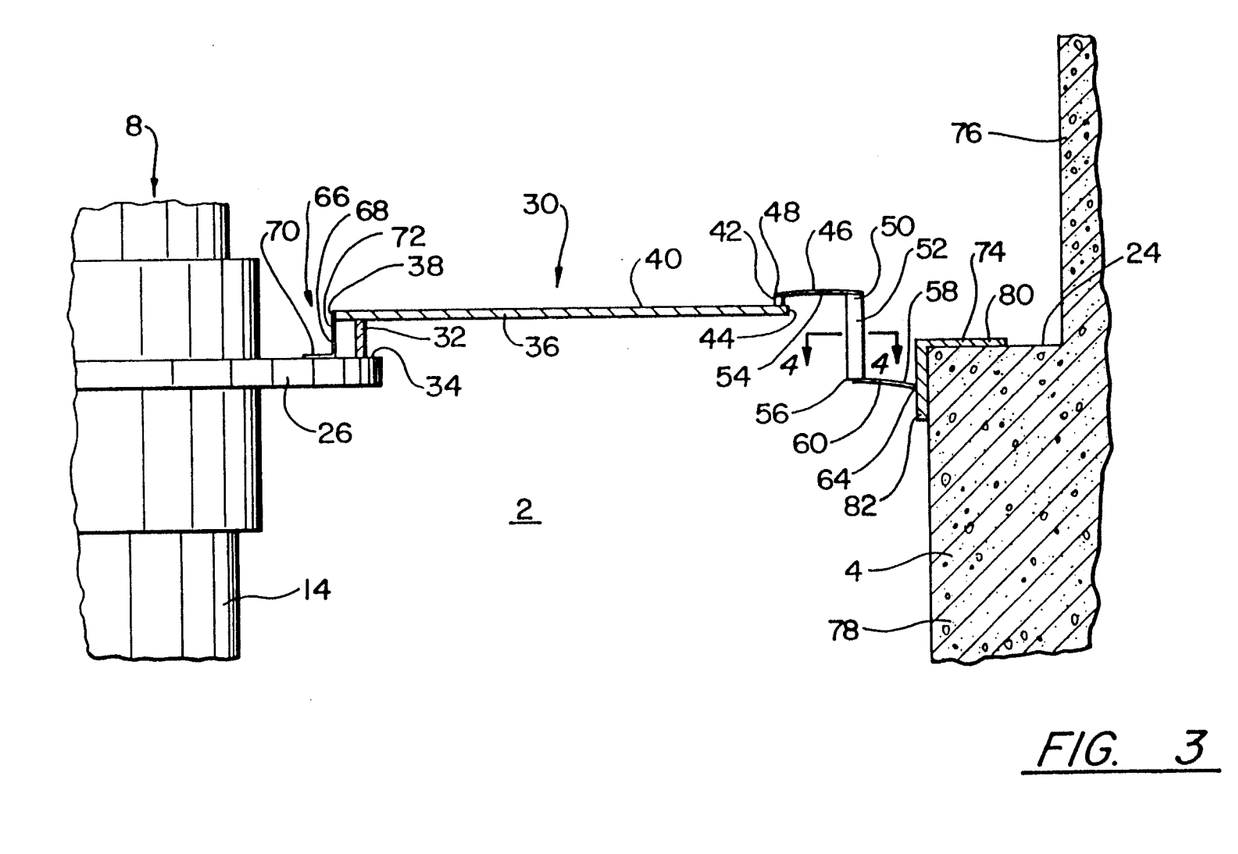
FIG. 3 is a cross-sectional view of a portion of the annular seal ring of FIG. 2 as viewed through section 3—3.

The detailed construction of the annular seal ring 30 of this invention can be better understood by reference to FIG. 3. According to a preferred embodiment of this invention, a cylindrical support 32 is attached to the upper surface 34 of the horizontally extending annular flange 26 and extends vertically upward therefrom. An annular main seal plate 36 extends across most of the gap 2 defined by the containment wall 4 and the peripheral wall 14 of the reactor vessel 8. The main seal plate 36 rests, near its inner edge 38, upon the cylindrical support 32. The upper side 40 of the main seal plate 36 preferably has an annular protrusion 42 extending upwards from a location proximate the main seal plate outer edge 44. A first annular Belleville plate 46 is welded to the annular protrusion near the Belleville plate's inner edge 48. The upper edge 50 of a radially corrugated vertical cylinder 52 is welded to the bottom side 54 of the Belleville plate near the plate's outer edge. The lower edge 56 of the radially corrugated vertical cylinder 52 is welded to the upper side 58 of a second annular Belleville plate 60 near the Belleville plate's inner edge. The outer edge 64 of the second Belleville plate is then sealingly affixed to the containment wall 4.

The inner flexible seal 66 is preferably provided by a flexible sealing member 68 having an L-shaped radial cross section. An annular, horizontally extending portion 70 is welded to the upper surface 34 of the annular flange 26. A cylindrical portion 72 is welded at its upper edge to the inner edge 38 of the main seal plate 36. The flexible sealing member 68 is located radially inside the cylindrical support 32 as depicted in FIG. 3.

Various arrangements can be used to provide a seal attachment of the second annular Belleville plate 60 to the containment wall 4. A preferred embodiment is depicted in FIG. 3. An annular member 74 having an L-shaped cross section attached to the ledge of the containment wall provides a fixture to weld to the second annular Belleville plate. The annular member 74 is affixed to and sealed to the concrete containment wall 4 by means well known in the construction arts.

All materials for the laterally translating permanent cavity seal 30 are preferably stainless steel although other materials with similar qualities of strength, flexibility and corrosion resistance can be equally useful. The main seal plate 36 is preferably 1-½ inches (2.5–3.8 cm) thick, providing a strong barrier to falling objects. While the dimensions of the inner and outer diameters of the main seal plate depend upon the sizes of the containment wall 4 and the reactor vessel 8, the inner diameter will generally be between 15 and 20 feet (460 and 730 cm) and the outer diameter between 25 and 30 feet (760 and 910 cm). The cylindrical support 32 that the main seal plate 36 rests upon will also be heavy gauge stainless steel and will be about 6–12 inches (15.2–30.5 cm) in height. The Belleville plates 46, 60, the radially corrugated cylinder, the flexible sealing member 68 and the L-shaped annular member 74 attached to the containment wall 4 are made of much lighter gauge stainless steel, generally 0.04–0.08 inches (0.10–0.20 cm) wall thickness, allowing for the necessary flexibility.

Figure 4:
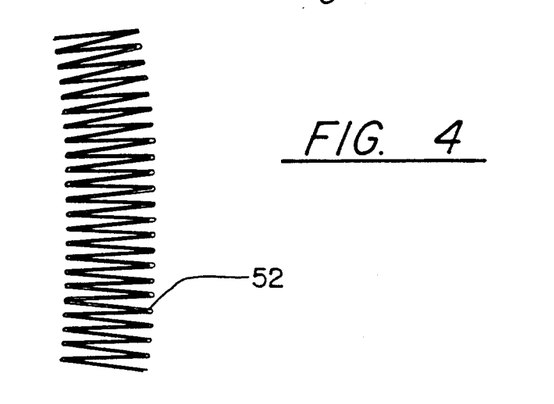
FIG. 4 is a cross-sectional view of a portion of the radially corrugated vertical cylinder of FIG. 3 as viewed through section line 4—4.

A segment of the radially corrugated vertical cylinder 52 is depicted in horizontal cross section in FIG. 4. Its vertical height will range between 6–12 inches (15.2–30.5 cm). The difference between the nominal inner and nominal outer radii of the radially corrugated vertical cylinder is typically 0.2–0.8 inches (0.51–2.03 cm). In other words, the amplitude of each of the corrugations is typically 0.2–0.8 inches (0.51–2.03 cm). The density of corrugations is approximately one per inch (0.4 per cm).

Figure 5:
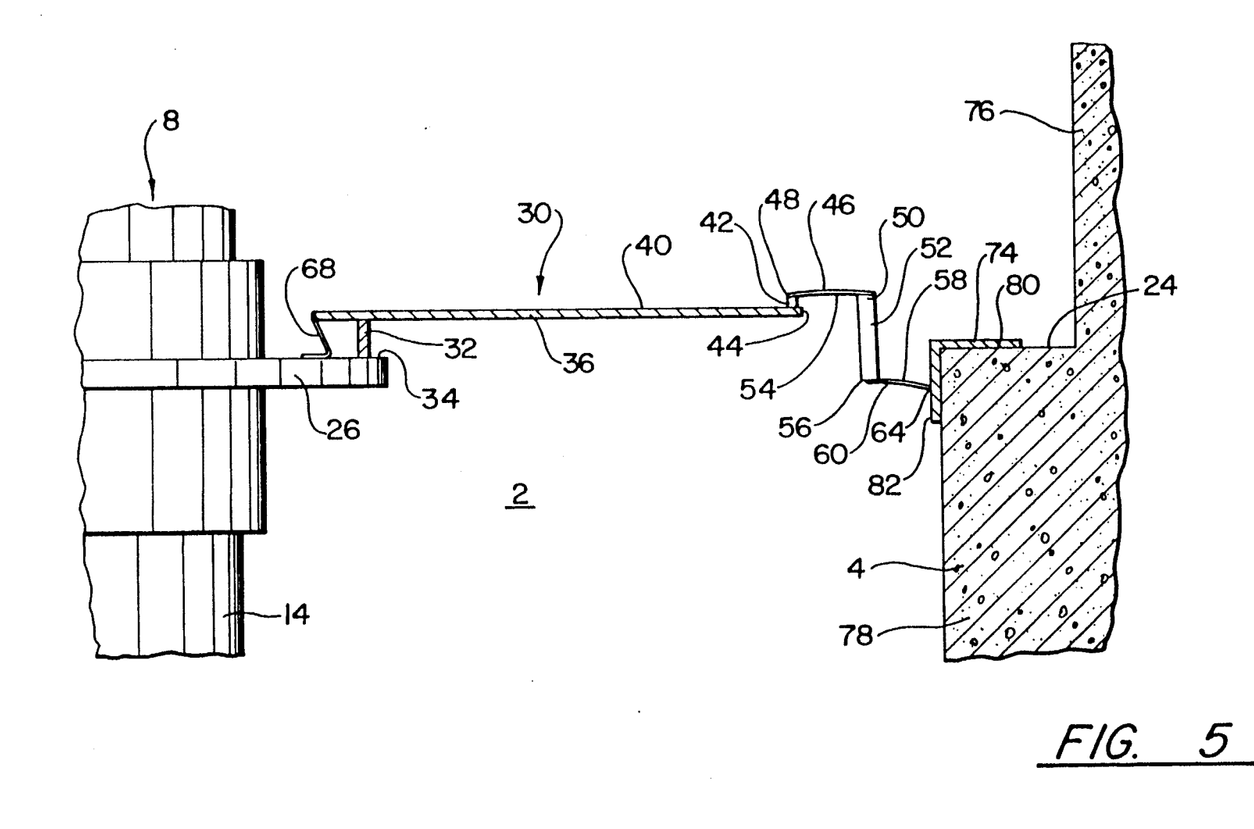
FIG. 5 is a cross-sectional view of a portion of this invention exhibiting radial contraction of the reactor vessel. An alternative embodiment of the outer seal is depicted.

During operation of the nuclear reactor 1, radial thermal expansion and contraction of the reactor vessel 8 is accommodated by the inner connection arrangement. Radial expansion of the reactor vessel 8 moves the horizontally extending annular flange 26 radially outward relative to the main seal plate 36. The cylindrical support 32 slips radially outward beneath the main seal plate 36. The lower, annular portion 70 of the inner flexure member 66 that is attached to the annular flange 26 moves radially outward relative to the main seal plate 36 as depicted in FIG. 5. Radial contraction of the reactor vessel 8 relative to the containment wall 4 involves movements in opposite directions from that described above.

Figure 6A:
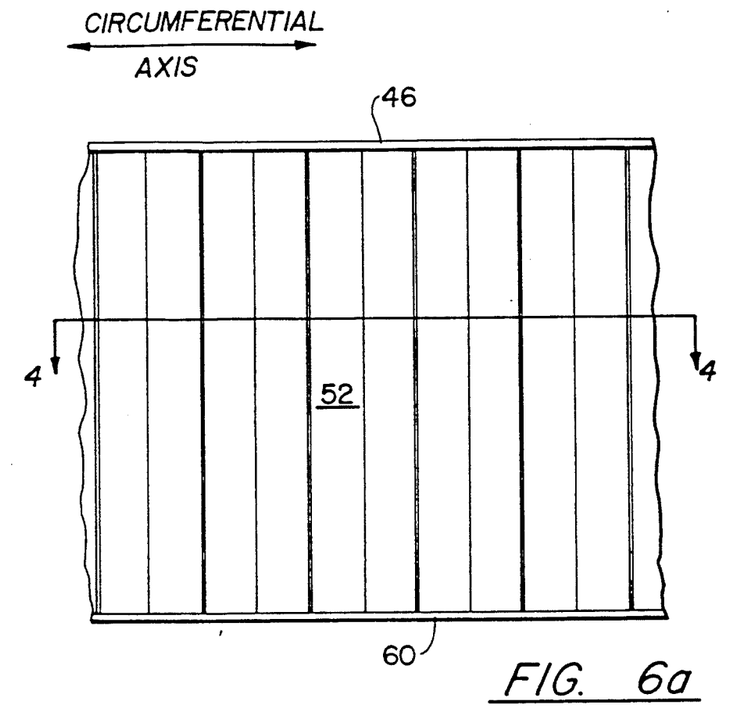
FIGS. 6a and b are radial views of a portion of the outer connection arrangement of this invention exhibiting a neutral position and lateral translation of the reactor vessel.
Figure 6B:
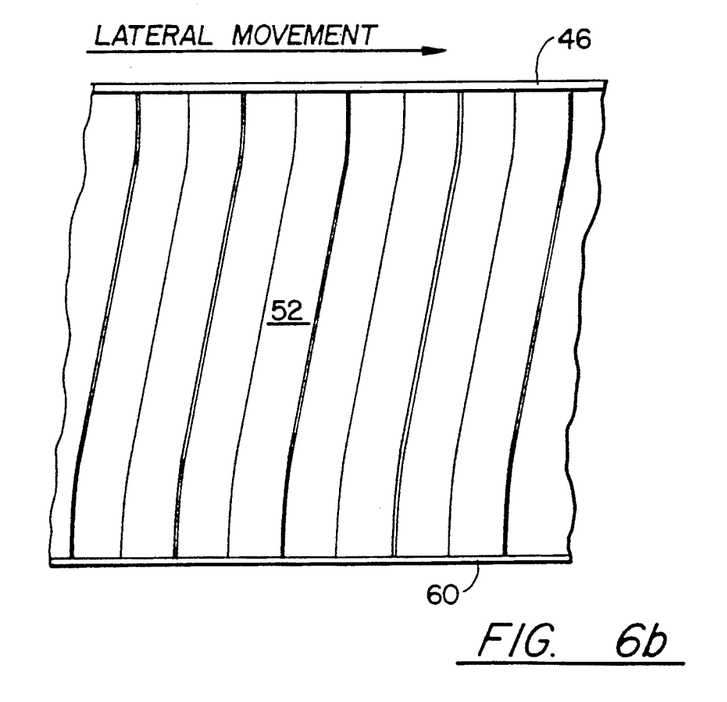

A lateral translation of the reactor vessel 8 relative to the containment wall 4 is mainly accommodated by the outer attachment arrangement comprising the Belleville plates 46, 60 and the radially corrugated vertical cylinder 52. FIG. 6a is a radial view of a section of the outer attachment arrangement in a neutral position. FIG. 6b shows the effect of lateral movement of the reactor vessel 8 (in a direction indicated by the arrow) on the outer attachment arrangement. Lateral movement of the main seal plate 36 in the horizontal plane will deform the upper end of the radially corrugated vertical cylinder 52 in the direction of the lateral movement. The upper end of the radially corrugated vertical cylinder, being attached to the first Belleville plate 46, will move rigidly with movement of the main seal plate 36 and the reactor vessel 8. The lower end of the radially corrugated vertical cylinder, being welded to the second Belleville plate 60 that is affixed to the containment wall 4, will typically remain in place. The flexible sealing member 68 does not significantly deform during a purely lateral movement of the reactor vessel 8.

Figure 7:
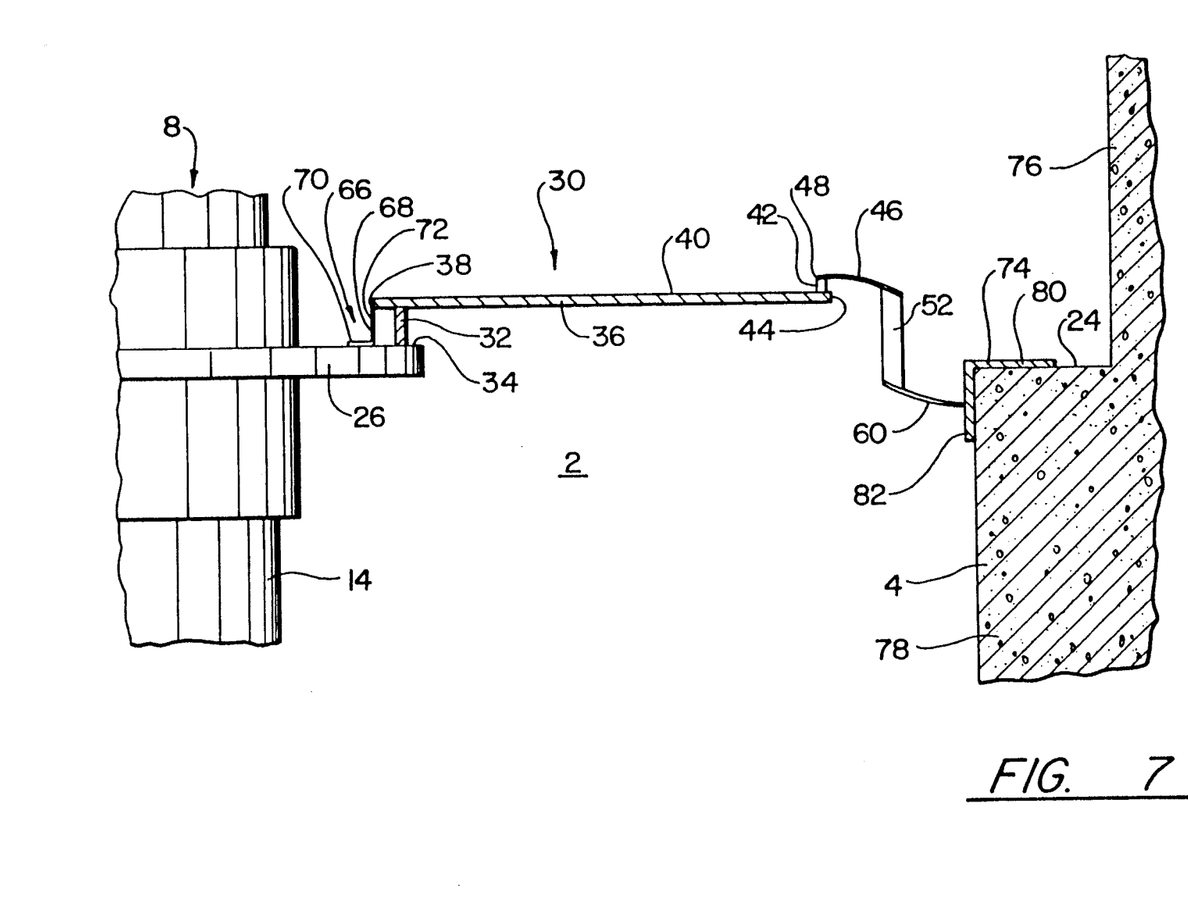
FIG. 7 is a cross-sectional view of a portion of the annular seal ring of FIG. 2 as viewed through section 3—3.

Axial thermal expansion/contraction of the reactor vessel 8 relative to the containment wall 4 is accommodated by flexure of the first 46 and second 58 Belleville plates as depicted in FIG. 7. Another embodiment of the outer attachment arrangement that provides for an equivalent degree of movement is arranged such that the radially corrugated vertical cylinder 52 is welded at its bottom edge to the upper side of the inner, first annular Belleville plate, and extends upwards therefrom. The outer, larger diameter, second annular Belleville plate is welded at its lower side proximate its inner edge to the upper edge of the radially corrugated cylinder. The second Belleville plate's outer edge is then sealingly affixed to the containment wall 4. This arrangement provides equivalent freedom of movement to those embodiments described above.

It will be understood that the above description of the present invention is capable of various additional modifications, changes and adaptations and the same are intended to be comprehended within the meaning and range of equivalents of the appended claims.

I claim:

1. A nuclear reactor containment arrangement, comprising:
   a reactor vessel having a peripheral wall and a horizontally extending annular flange thereon;
   a containment wall spaced apart from and surrounding the peripheral wall of the reactor vessel and defining an annular gap therebetween; and
   an annular ring seal extending across the annular gap and providing a water-tight seal therebetween, characterized by:
      a cylindrical support affixed to an upper surface of the annular flange and extending upward therefrom;
      an annular main seal plate characterized by inner and outer edges spaced radially apart, spaced apart first and second surfaces extending between the inner and outer edges, the main seal plate extending substantially horizontally across a portion of the annular gap and supported by the cylindrical support;
   inner flexible sealing means for sealing the reactor vessel to the main seal plate, positioned radially inward from the cylindrical support;
   a first annular Belleville plate characterized by inner and outer edges spaced radially apart, sealingly affixed proximate its inner edge to the main seal plate and extending substantially radially outward therefrom;
   a corrugated cylinder characterized by axially spaced apart first and second edges and radial corrugations extending longitudinally between the first and second edges, the first edge being sealingly affixed to a surface of the first annular Belleville plate proximate the outer edge of the first Belleville plate,
   a second annular Belleville plate characterized by inner and outer edges spaced radially apart, the second edge of the corrugated cylinder being sealingly affixed to a surface of the second annular Belleville plate proximate the second Belleville plate inner edge, the second Belleville plate extending substantially radially outward therefrom; and outer sealing means for sealingly affixing the second annular Belleville plate to the containment wall.

2. The containment arrangement of claim 1, characterized in that the inner flexible sealing means comprises a sealing member, the sealing member being characterized by an annular horizontal portion sealingly affixed to the upper surface of the annular flange and a cylindrical portion extending upwards from the horizontal portion and sealingly affixed to the main seal plate proximate the inner edge of the main seal plate.

3. The containment arrangement of claim 2, characterized in that the outer sealing means comprises an attachment plate sealingly affixed to the containment wall, and the second annular Belleville plate is sealingly affixed at its outer edge to the attachment plate.

4. The containment arrangement of claim 3, characterized in that the containment wall comprises vertically extending upper and lower portions, the upper portion having a greater diameter than the lower portion, and a ledge therebetween, in that the attachment plate comprises a cylindrical portion extending down from the ledge along the lower portion of the containment wall and an annular portion positioned on the ledge, and in that the outer edge of the second annular Belleville plate is sealingly affixed to the cylindrical portion of the attachment plate.

5. A nuclear reactor containment arrangement, comprising:

a reactor vessel having a peripheral wall and a horizontally extending annular flange thereon;

a containment wall spaced apart from, and surrounding the peripheral wall of the reactor vessel and defining an annular gap therebetween; and a annular ring seal extending across the annular gap and providing a water-tight seal therebetween, characterized by:

an annular main seal plate characterized by inner and outer edges spaced radially apart, spaced apart surfaces extending between the inner and outer edges, the main seal plate extending substantially horizontally across a portion of the annular gap;

inner connection means for supporting the main seal plate on the annular flange with accommodation for radial thermal expansion and contraction of the reactor vessel, and providing a water-tight seal between the main seal plate and the annular flange; and outer connection means for supporting the main seal plate by the containment wall with a water-tight seal and with accommodation for axial thermal expansion and contraction and lateral movement of the reactor vessel; the outer connection means including a first Belleville plate connected to the main seal plate, a second Belleville plate connected to the containment wall, the first and second Belleville plates accommodating for axial thermal expansion and contraction of the reactor vessel, and means connected between the first and second Belleville plates accommodating for lateral movement of the reactor vessel.

6. The containment arrangement of claim 5, characterized in that the inner connection means comprises a cylindrical support affixed to an upper surface of the annular flange and extending upward therefrom and upon which the main seal plate rests, and flexible sealing means radially inside the cylindrical support and extending between the main seal plate and the annular flange for providing a watertight seal therebetween.

7. The containment arrangement of claim 5, characterized in that the means accommodating for lateral movement of the reactor vessel comprises a corrugated cylinder characterized by axially spaced apart first and second edges and radial corrugations extending longitudinally between the first and second edges.

8. The containment arrangement of claim 7, characterized in that the outer connection means further includes an annular protrusion extending from one of the surfaces of the main seal plate proximate the outer edge of the main seal plate and providing a surface for attachment of the first Belleville plate.

9. The containment arrangement of claim 7, characterized in that the inner connection means comprises a cylindrical support affixed to an upper surface of the annular flange and extending upward therefrom and which supports the main seal plate, and flexible sealing means proximate the cylindrical support and extending between the main seal plate and the annular flange for providing a water-tight seal therebetween.

10. The containment arrangement of claim 9, characterized in that the flexible sealing means comprises a sealing member characterized by an annular horizontal portion sealingly affixed to the annular flange and a cylindrical portion extending upwards from the horizontal portion and sealingly affixed to the main seal plate.

* * * * *